(12) United States Patent
Raussi

(10) Patent No.: US 6,204,830 B1
(45) Date of Patent: *Mar. 20, 2001

(54) MONITOR HAVING BASE WITH SOUND REPRODUCING ELEMENT FOR PROVIDING SOUND FREQUENCIES AT SELF-RESONANT FREQUENCY

(75) Inventor: Tommi Raussi, Halikko (FI)

(73) Assignee: Nokia Technology GmbH, Pforzheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,991

(22) Filed: Jan. 15, 1997

(30) Foreign Application Priority Data

Jan. 15, 1996 (FI) ........................................ 960172

(51) Int. Cl.⁷ ............................... G09G 1/06; A61F 11/06
(52) U.S. Cl. ........................... 345/10; 381/71.1; 381/71.3
(58) Field of Search .................. 381/71.3, 71.7, 381/71.14, 71.13, 71.12, 300, 306, 98, 88; 345/10

(56) References Cited

U.S. PATENT DOCUMENTS

| 4,410,761 | * | 10/1983 | Schickedanz | 386/97 |
|---|---|---|---|---|
| 4,489,441 | * | 12/1984 | Chaplin | 381/71.13 |
| 5,119,429 | * | 6/1992 | Chatelain | 381/306 |
| 5,245,385 | * | 9/1993 | Fukumizu et al. | 381/71.3 |
| 5,400,408 | * | 3/1995 | Lundgren et al. | 381/88 |
| 5,521,449 | * | 5/1996 | Tao | 315/169.1 |
| 5,587,876 | * | 12/1996 | O'Brien et al. | 361/682 |
| 5,588,063 | * | 12/1996 | Edgar | 381/300 |
| 5,623,391 | * | 4/1997 | Chase et al. | 361/681 |
| 5,636,286 | * | 6/1997 | Makabe et al. | 381/71.7 |
| 5,668,882 | * | 9/1997 | Hickman et al. | 381/300 |
| 5,689,574 | * | 11/1997 | Heirch et al. | 381/354 |
| 5,701,347 | * | 12/1997 | Daniels et al. | 381/300 |
| 5,719,945 | * | 2/1998 | Fuller et al. | 381/71.2 |
| 5,802,188 | * | 9/1998 | McDonough | 381/345 |
| 5,828,768 | * | 10/1998 | Eatwell et al. | 381/333 |

* cited by examiner

Primary Examiner—Steven Saras
Assistant Examiner—Alecia D. Nelson
(74) Attorney, Agent, or Firm—Ware, Fressola, Van Der Sluys & Adolphson LLP

(57) ABSTRACT

The invention relates to a monitor comprising a picture tube and an audio part mounted on a base. The picture tube unit (1) of the monitor includes main sound reproduction elements (6, 7) for the production of sound frequencies deviating from the self-resonant frequency. The base (2) comprises a bass unit which is used to reproduce sound frequencies at the self-resonant frequency. Thus, it is possible to dampen the vibration caused by the self resonant frequencies so that these frequencies do not harmfully interfere with the picture display. The invention is applicable especially in connection with a picture tube operating have a fine pitch shadow mask.

8 Claims, 1 Drawing Sheet

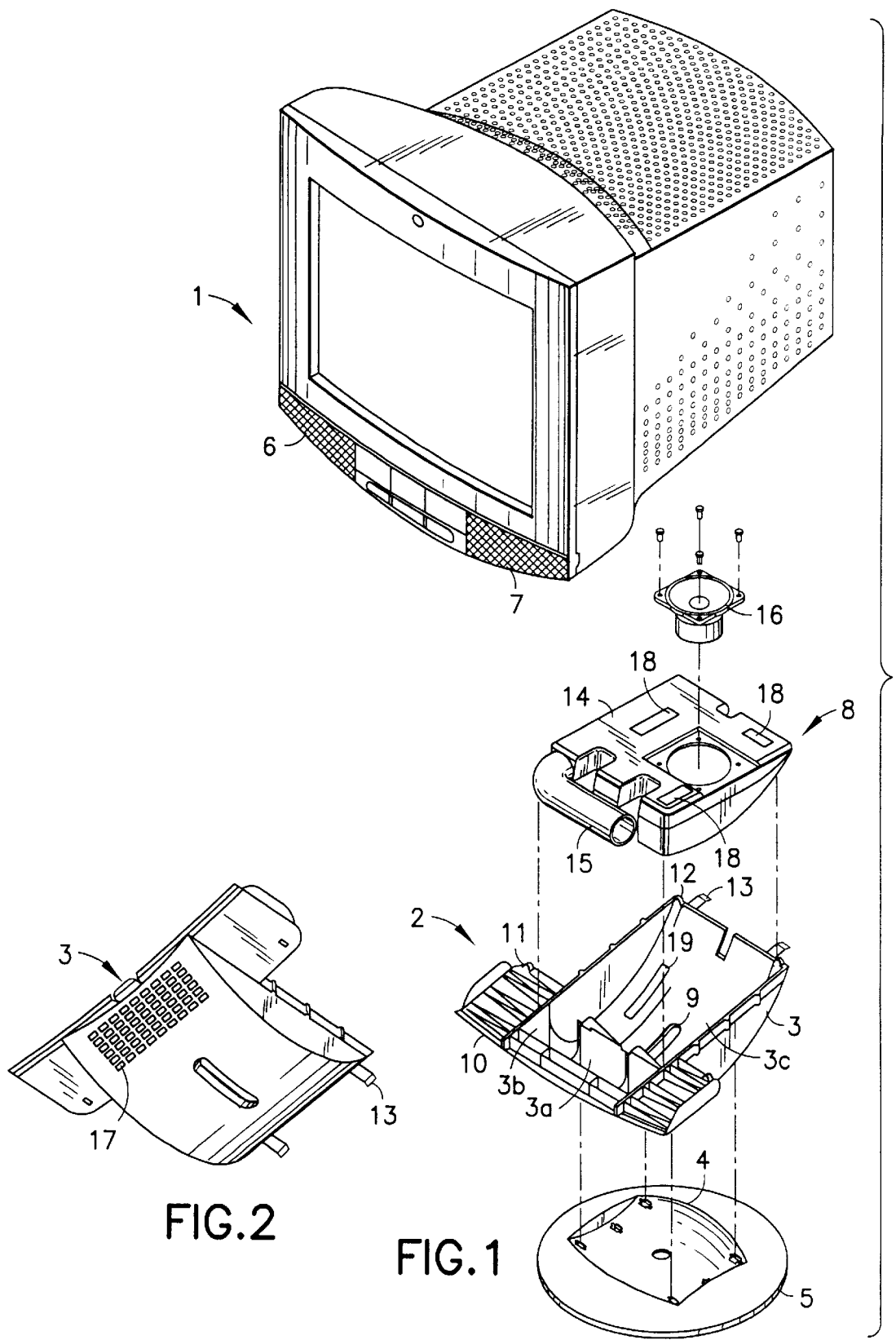

MONITOR HAVING BASE WITH SOUND REPRODUCING ELEMENT FOR PROVIDING SOUND FREQUENCIES AT SELF-RESONANT FREQUENCY

TECHNICAL FIELD

The present invention relates to the technologies of picture and sound reproduction and applies to a monitor comprising a picture tube and an audio reproduction device. The invention is applicable especially in connection with a picture tube for enhanced resolution and therefore with a fine pitch shadow mask or screen respectively.

BACKGROUND OF THE INVENTION

The coexistence of a picture tube and an audio reproduction device in the same housing can lead to visual and audible problems when the audio output power increases and if there is tight mechanical coupling between the picture tube and parts vibrating in response to the electrical audio power.

One of these mentioned problems is audible buzz. The buzzing sound is in most cases created by vibration of the shadow mask or of the shadow mask frame when the audio output level is high and when the momentary audio frequency is at or near the self-resonant frequency of the shadow mask or the mask/frame arrangement.

Another problem is the unwanted modulation of the electron beam intensity due to the vibration of the shadow mask or its components caused by insufficient mechanical decoupling from the sound reproduction equipment as described above. This leads to brightness variations and/or colour purity imperfections appearing in synchronism with the momentary audio frequency. It is obvious that this mentioned problem is worse at or near the self-resonant frequency of the mask or the mask/frame arrangement.

Unfortunately, this second problem is further increased when for a high resolution monitor a picture tube with a fine pitch is selected because the same vibration amplitude of shadow mask components, e.g. wires in case of a Trinitron® type, causes a larger relative landing error on the screen.

SUMMARY OF THE INVENTION

In the following we will call the unwanted brightness/colour variation "flicker". The self-resonant frequency of the shadow mask or its components will be called self-resonant frequency of the picture tube because this value is fairly constant for a given type of picture tube. It is the object of this invention to reduce this secondly mentioned problem, the flicker, but naturally all measures against flicker also help against the firstly mentioned problem, i.e. buzz.

The invention relates to a monitor comprising a picture tube unit with a certain self-resonant frequency, a base and sound reproduction elements, characterized in that the picture tube unit includes a main sound reproduction element used to reproduce only audio frequencies deviating from the self-resonant frequency, and that the base has an additional sound reproduction element which is used for reproduction of sound frequencies at the self-resonant frequency.

According to the invention, sounds at or near the self-resonant frequency of the picture tube are reproduced through the base. This makes it possible to improve the decoupling between the audio sound pressure source and the picture tube.

BRIEF DESCRIPTION OF THE DRAWINGS

The enclosed drawings form a part of the description of the present invention. In the drawings FIG. 1 is an exploded view of the whole monitor; and FIG. 2 is a bottom view of a rocker turning in the vertical level of the base.

BEST MODE FOR CARRYING OUT THE INVENTION

Audio reproduction devices in monitors must be able to reproduce a relatively wide audio range (e.g. 60 Hz–16 kHz). Each picture tube has a typical specific resonance at a certain sound frequency depending on the type and manufacturing method of the picture tube. The self-resonant frequency is to be found at the lower part of the sound frequency range, especially in the range of 200 Hz–1 kHz (typically in the range of 250–350 Hz). At or near the self-resonant frequency, sound pressure changes directed to the picture tube can cause interference in the picture reproduction, the so-called flicker. The finer the pitch of the screen, the bigger is the vulnerability to interference.

A device of the invention includes a picture tube unit 1 and a base 2, the picture tube unit 1 being heavier than the base 2. The base has a rocker 3 fastened to the monitor bottom, a rocker base 4 adapted to be turned in the vertical direction, and a base 5 to which the rocker base has been fitted for rotation around the vertical axis. Thus, the picture tube unit and rocker can always be directed to the desired direction.

Main audio channel units 6 and 7, which are important for stereo reproduction, are placed to the sides of the picture tube unit 1. The lower end (e.g. under 350 Hz) of the audio frequency range reproduced by the main channels, including the resonant frequency of the picture tube, however, has been deleted from these main audio channel units 6 and 7, and this lower end audio frequency range is reproduced by a bass unit 8 placed inside the rocker 3 at the monitor base 2.

The rocker 3 is in form of a curved, flat-bottomed chute. The bottom of the chute has a groove 9 parallel to the chute, from which the rocker is slidably mounted to the rocker base 4. In its front end, the rocker has side projections 10, which support the picture tube unit 1 mounted on top of the rocker. For fastening the picture tube unit, the rocker has fastening elements 11 and 12 and locking elements 13. In the front end of the rocker there is a transverse wall 3a dividing the chute to a rear space 3b and a smaller front space 3c.

The bass unit 8 has a bass reflex casing 14 corresponding to the form of the rocker rear space, and a reflex tube 15 protruding from the front wall. The reflex tube 15 is situated transversely to the front space of the rocker. The projecting end of the reflex tube is directed towards the side wall of the front space. Speaker 16 is mounted on the top surface of the casing. The front wall of the front space has in its middle output openings 17. Air pressure changes from the speaker are thus directed out for reproduction through the reflex tube and the openings. Naturally, some bass frequencies are also emitted through other openings, but their amount is so small that the apparent source location is the rocker front wall. Sealings 18 made of suitable material and corresponding to the bottom of the picture tube unit have been fastened on the top surface of the casing 14. Likewise, the bottom of the rocker may include sealings 19.

The picture tube unit 1, rocker 3 and casing 14 are dimensioned so that when the fastening elements are active, the picture tube unit presses the casing evenly against the rocker base to prevent the casing from vibrating. Thus, damping of vibration, using the weight of the whole picture tube unit is produced, the base 2 preventing the vibration caused by the bass unit 8 from being transferred to the picture tube unit, and the weight of the picture tube unit preventing the base from vibrating. In addition, a surface (e.g. a table) placed under the device, and the bottoms of the device reflect and amplify low frequencies in the vertical direction. Thus, there is less need for sound pressure which also means there are less harmful sound pressure changes directed to the picture tube. Low sound frequencies are omnidirectional, that means that by sending them from one point in the middle of the main channels one does not significantly impair the stereo impression.

When turning the picture tube unit 1, the main channels 6 and 7, and the bass channel 17 turn simultaneously so that sound is always within the same range and direction. All sounds are also emitted essentially from the same level so there is no harmful delay present.

Indeed, the picture tube does not only have one self-resonant frequency because different components with different mechanical dimensions will have different self-resonant frequencies and different vibration modes. In practice most of these side resonant frequencies fall into the same frequency range of 250 to 350 Hz as mentioned before. In most cases the vibration amplitude of these side resonances is smaller than that of the most prominent one which we have called the self-resonant frequency of the picture tube.

If a side resonance is found to be of a similar amplitude as the main one it is necessary to adjust the filter components determining the reproduction frequency ranges of the bass unit 8 and the main audio channels 6 and 7 so that also this side resonant audio frequency is reproduced by bass unit 8 instead of main audio channels 6 and 7. The additional bass unit 8 of the base may not only reproduce the resonance frequency, but also frequencies lower than that.

In any case it is possible to design the filter components or set the filter coefficients in such a way that the problems mentioned above are avoided and there is no audible sound imperfection.

What is claimed is:

1. A monitor comprising a picture tube unit (1) with a self-resonant frequency, a base (2) and sound reproduction elements that provide audio output signals with an audio frequency causing undesirable vibration of the picture tube unit (1) when the audio frequency is at or substantially around the self-resonant frequency, characterized in that the sound reproduction elements include a main sound reproduction element (6, 7) and an additional sound reproduction element (16);

the picture tube unit (1) is mounted on the base (2) and includes the main sound reproduction element (6, 7) to reproduce substantially audio frequencies other than the self-resonant frequency, and the base (2) has the additional sound reproduction element (16) arranged therein to reproduce separately sound frequencies at or substantially around the self-resonant frequency to minimize the undesirable vibration of the picture tube unit (1) at the self-resonant frequency.

2. A monitor according to claim 1, characterized in that the additional sound reproduction element (16) is also used to reproduce sound frequencies that are lower than the self-resonant frequency.

3. A monitor according to claim 2, characterized in that the picture tube unit (1) is mounted on a base (2).

4. A monitor according to claim 3, characterized in that the picture tube unit (1) is heavier than the base (2).

5. A monitor according to claim 4, characterized in that the base comprises a reflex casing (14) to which the additional sound reproduction element (16) is fastened.

6. A monitor according to claim 5, characterized in that the base includes a frame element (3), to which the reflex casing is placed so that it is pressed against the frame element by the picture tube unit.

7. A monitor according to claim 6, characterized in that elastic sealings (18) are placed between the picture tube unit and the reflex casing.

8. A monitor according to claim 7, characterized in that the monitor has two main sound reproduction elements (6,7), the sound of which comes out from the sides of the picture tube unit, and wherein for the additional sound reproduction element (16), the sound comes out between output opening (17) formed within the frame element (3).

* * * * *

UNITED STATES PATENT AND TRADEMARK OFFICE
CERTIFICATE OF CORRECTION

PATENT NO. : 6,204,830 B1
DATED : March 20, 2001
INVENTOR(S) : Raussi

Page 1 of 1

It is certified that error appears in the above-identified patent and that said Letters Patent is hereby corrected as shown below:

Title page,
Item [57], ABSTRACT,
Line 8, please delete "self resonant" and insert -- self-resonant --.

Signed and Sealed this

Thirteenth Day of November, 2001

Attest:

*Attesting Officer*

NICHOLAS P. GODICI
*Acting Director of the United States Patent and Trademark Office*